United States Patent
Chen et al.

(10) Patent No.: US 11,459,241 B2
(45) Date of Patent: Oct. 4, 2022

(54) METHOD FOR PREPARING ARTIFICIAL GRAPHITE

(71) Applicant: CPC CORPORATION, TAIWAN, Kaohsiung (TW)

(72) Inventors: Yan-Shi Chen, Chia-Yi (TW); Gao-Shee Leu, Chia-Yi (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 128 days.

(21) Appl. No.: 17/167,111

(22) Filed: Feb. 4, 2021

(65) Prior Publication Data

US 2022/0153590 A1 May 19, 2022

(30) Foreign Application Priority Data

Nov. 19, 2020 (TW) .................................. 109140440

(51) Int. Cl.
*C01B 32/205* (2017.01)

(52) U.S. Cl.
CPC ........ *C01B 32/205* (2017.08); *C01B 2204/22* (2013.01); *C01B 2204/32* (2013.01); *C01P 2002/72* (2013.01); *C01P 2002/82* (2013.01); *C01P 2004/02* (2013.01); *C01P 2004/61* (2013.01)

(58) Field of Classification Search
CPC .............. C01B 32/205; C01B 2204/22; C01B 2204/32; C01P 2002/72; C01P 2002/82; C01P 2004/02; C01P 2004/61
See application file for complete search history.

(56) References Cited

U.S. PATENT DOCUMENTS

| | | |
|---|---|---|
| 2003/0175591 A1 | 9/2003 | Choi et al. |
| 2013/0089491 A1* | 4/2013 | Tano ...................... H01M 4/587 585/13 |
| 2016/0160396 A1* | 6/2016 | Deshpande ............. D01F 9/225 422/198 |

FOREIGN PATENT DOCUMENTS

JP 02088464 A * 3/1990

* cited by examiner

*Primary Examiner* — Richard M Rump

(57) ABSTRACT

A method for preparing artificial graphite includes (A) preparing heavy oil, and forming coke from the heavy oil through continuous coking reaction such that the coke has a plurality of mesophase domains, wherein a size of the mesophase domains ranges between 1 and 30 μm by polarizing microscope analysis; and (B) processing the coke formed by step (A) sequentially by pre-burning carbonization treatment, grinding classification, high-temperature carbonization treatment and graphitization treatment to form polycrystalline artificial graphite from the coke. The method for preparing artificial graphite of the present invention and the polycrystalline artificial graphite prepared thereby are applicable to batteries.

9 Claims, 20 Drawing Sheets

(A) Prepare heavy oil, and form coke from the heavy oil by continuous coking reaction such that the coke has a plurality of mesophase domains, wherein a size of the mesophase domains ranges between 1 and 30 m by polarizing microscope analysis ~S1

(B) Process the coke formed by step (A) sequentially by pre-burning carbonization treatment, grinding classification, high-temperature carbonization treatment and graphitization treatment to form polycrystalline artificial graphite from the coke ~S2

First embodiment

First comparison example

METHOD FOR PREPARING ARTIFICIAL GRAPHITE

CROSS-REFERENCE TO RELATED APPLICATION

This non-provisional application claims priority under 35 U.S.C. § 119(a) on Patent Application No(s). 109140440 filed in Taiwan, R.O.C. on Nov. 19, 2020, the entire contents of which are hereby incorporated by reference.

BACKGROUND OF THE INVENTION

1. Field of the Invention

The present disclosure relates to a method for preparing artificial graphite, and in particular to a method for preparing polycrystalline artificial graphite through continuous coking reaction.

2. Description of the Related Art

Artificial graphite can be applied in batteries (for example, lithium cells) to serve as the material of negative electrodes of the batteries. The crystal form of artificial graphite has a critical influence on the charging/discharging performance of batteries containing the artificial graphite. Therefore, how to improve the crystal form of artificial graphite so as to enhance the charging/discharging performance of the batteries applying the artificial graphite is an issue that needs to be solved by the technical field pertinent to the present invention.

The U.S. Patent Publication No. 2003/0175591 A1 discloses a method for preparing a negative electrode active material for a lithium-based secondary battery. The method includes the steps of dissolving a coal tar pitch or a petroleum pitch in an organic solvent to remove insoluble components thereof, heat-treating the pitch at a temperature in the range of 400 to 450° C. for 30 minutes or more under an inert atmosphere to thereby produce mesophase particles, stabilizing or coking the mesophase particles, carbonizing the stabilized or coked mesophase particles at a temperature in the range of 1000 to 1300° C., and graphitizing the carbonized mesophase particles at a temperature in the range of 2500 to 3000° C. to thereby form a graphite-like carbon material. However, the U.S. Patent Publication No. 2003/0175591 A1 does not disclose how to enhance, by means of improving the crystal form of artificial graphite, the charging/discharging performance of a battery applying the artificial graphite—the graphite-like carbon material prepared by the disclosed method yet needs to be further improved in the aspect of charging/discharging performance.

BRIEF SUMMARY OF THE INVENTION

The present invention provides a method for preparing artificial graphite to improve the crystal form of artificial graphite so as to enhance the charging/discharging performance of a battery applying the artificial graphite.

To achieve the above and other objects, the present invention provides a method for preparing artificial graphite, the method including: (A) preparing heavy oil, and forming coke from the heavy oil through continuous coking reaction so that the coke has a plurality of mesophase domains, wherein the size of the mesophase domains ranges between 1 and 30 μm by polarizing microscope analysis; and (B) processing the coke formed in step (A) sequentially by pre-burning carbonization treatment, grinding classification, high-temperature carbonization treatment and graphitization treatment to form polycrystalline artificial graphite from the coke.

In the foregoing method for preparing artificial graphite, the (002) crystal plane size $L_c$ of the polycrystalline artificial graphite is less than 30 nm.

In the foregoing method for preparing artificial graphite, the (110) crystal plane size $L_a$ of the polycrystalline artificial graphite is between 120 nm and 160 nm.

In the foregoing method for preparing artificial graphite, step (A) includes: transporting the heavy oil into a heating furnace to heat the heavy oil under conditions of a heating temperature ranging between 480° C. and 520° C. at a pressure ranging between 0.18 Mpa and 0.22 Mpa for a heating time ranging between 0.01 hour and 0.02 hour, simultaneously transporting water into the heating furnace to produce water vapor, transporting the heated heavy oil at a high flow speed of 0.02 $m^3$/s to 0.03 $m^3$/s in the presence of the water vapor by a delivery pipe to a coking tower, and causing the heated heavy oil to crack and condensation polymerize under conditions of a reaction temperature ranging between 470° C. and 520° C. at a pressure ranging between 0.18 Mpa and 0.22 Mpa for a reaction time ranging between 16 hours and 24 hours to form coke.

In the foregoing method for preparing artificial graphite, the content of water can range between 0.8 wt % and 1.2 wt % of the total of the heavy oil.

In the foregoing method for preparing artificial graphite, wherein in step (B), the calcining temperature of the pre-burning carbonization treatment can range between 800° C. and 1000° C., and the calcining time can range between 4 hours and 16 hours.

In the foregoing method for preparing artificial graphite, wherein in step (B), the grinding classification can grind and sieve by a cyclone classifier the pre-burning carbonization treatment processed coke to select the pre-burning carbonization treatment processed coke having an average particle diameter $D_{50}$ of 12 μm to 15 μm.

In the foregoing method for preparing artificial graphite, wherein in step (B), the calcining temperature of the high-temperature carbonization treatment can range between 1000° C. and 1200° C. and can be higher than the calcining temperature of the pre-burning carbonization treatment, and the calcining time can range between 4 hours and 20 hours.

In the foregoing method for preparing artificial graphite, wherein in step (B), wherein the calcining temperature of the graphitization treatment is 2900° C. to 3000° C. and a soak time is 8 hours to 30 days.

In the method for preparing artificial graphite of the present invention, coke is formed from heavy oil by continuous coking reaction to thereby form polycrystalline artificial graphite. It is tested that, compared to a method of forming coke from heavy oil by batch coking reaction, a battery including the polycrystalline artificial graphite prepared by the method for preparing artificial graphite of the present invention yields better charging/discharging performance.

DETAILED DESCRIPTION OF THE INVENTION

The following is a specific embodiment to illustrate the implementation of the present invention. Those familiar with the art can understand the other advantages and effects of the present invention from the content disclosed in this specification. The present invention can also be implemented or applied by other different specific embodiments, and various details in this specification can also be based on different viewpoints and applications, and various modifications and changes can be made without departing from the spirit of the present invention.

Unless otherwise specified in the disclosure, the singular form "a/an" and "the" used in the detailed description and the appended claims include the meaning of the plural form.

Unless otherwise specified in the disclosure, the term "or" used in the detailed description and the appended claims includes the meaning of "and/or".

First Embodiment

Figure 1:
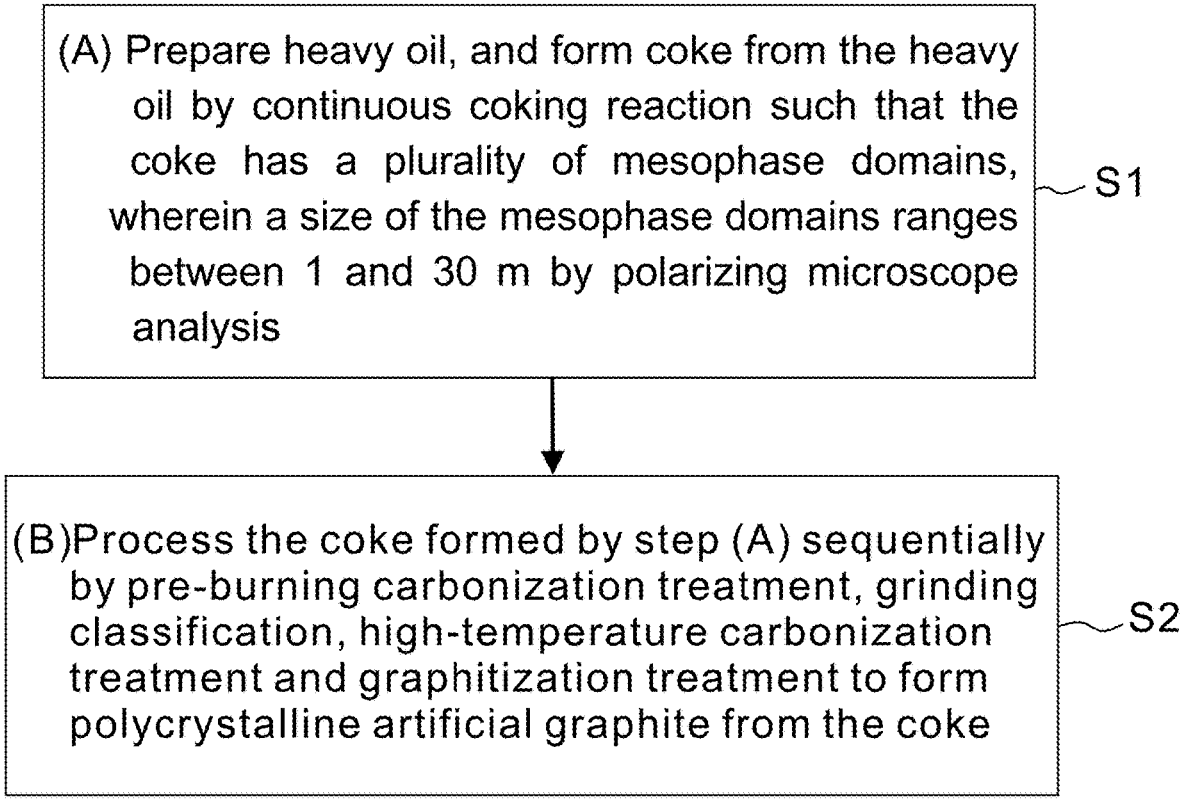
FIG. 1 is a flowchart of a method for preparing artificial graphite according to a first embodiment.

FIG. 1 shows a method for preparing artificial graphite according to a first embodiment. As shown, the method includes: S1, (A) preparing heavy oil, and forming coke from the heavy oil through continuous coking reaction, so that the coke has a plurality of mesophase domains, wherein the size of the mesophase domains ranges between 1 and 30 μm by polarizing microscope (manufacturer: Nikon; Model: Eclipse LV100POL) analysis; and S2, (B) processing the coke formed in step (A) sequentially by pre-burning carbonization treatment, grinding classification, high-temperature carbonization treatment and graphitization treatment to form polycrystalline artificial graphite from the coke.

In the method for preparing artificial graphite of the first embodiment, coke having a plurality of mesophase domains with a size ranging between 1 and 30 μm is formed from the heavy oil through continuous coking reaction, thereby further forming polycrystalline artificial graphite from the coke by subsequent processes.

More specifically, step (A) of the first embodiment is performed according to the following process conditions: the heavy oil is transported into a heating furnace, the heavy oil is heated under conditions of a heating temperature of 500° C. at a pressure of 0.3 Mpa and for a heating time of 0.02 hour, at the same time water is transported into the heating furnace for heating to produce water vapor (the content of the water is 0.8 wt % to 1.2 wt % of the total of the heavy oil), the heated heavy oil is transported at a flow speed of 0.03 $m^3$/s in the presence of the water vapor by a delivery pipe into a coking tower, the heated heavy oil in the coking tower is then caused to crack and condensation polymerize under conditions of a reaction temperature of 490° C. at a pressure of 0.2 Mpa for a reaction time of 24 hours to form coke, the coking tower is cooled to room temperature, and the coke is taken out from the coking tower.

More specifically, step (B) of the first embodiment is performed according to the following process conditions: the coke prepared by step (A) is processed by pre-burning carbonization treatment, the pre-burning carbonization treatment processed coke is ground and sieved by a cyclone classifier to select the pre-burning carbonization treatment processed coke having an average particle diameter $D_{50}$ of 12 μm to 15 μm, and is processed by high-temperature carbonization treatment to obtain soft carbon, and the soft carbon is further processed by graphitization treatment to obtain artificial graphite. The heating rate of the pre-burning carbonization treatment is 10° C./min, and the calcining temperature is 850° C. for a soak time of 4 hours; the heating rate of the high-temperature carbonization treatment is 10° C./min, and the calcining temperature is 1100° C. for a soak time of 4 hours; the calcining temperature of the graphitization treatment is 2950° C. for a soak time of 8 hours.

The process conditions of the first embodiment given above are merely examples and the present invention is not limited thereto.

For example, step (A) can be performed within the following process conditions: the heavy oil is transported into a heating furnace, and the heavy oil is heated under conditions of a heating temperature ranging between 480° C. and 520° C. at a pressure ranging between 0.18 Mpa and 0.22 Mpa for a heating time ranging between 0.01 hour and 0.02 hour, at the same time water is transported into the heating furnace for heating to produce water vapor (the content of the water is 0.8 wt % to 1.2 wt % of the total of the heavy oil), the heated heavy oil is transported at a high flow speed of, for example, but not limited to, 0.02 m³/s to 0.03 m³/s in the presence of the water vapor by a delivery pipe into a coking tower, and the heated heavy oil is caused to crack and condensation polymerize under conditions of a reaction temperature ranging between 470° C. and 520° C. at a pressure ranging between 0.18 Mpa and 0.22 Mpa for a reaction time ranging between 16 hours and 24 hours to form coke.

For example, the processes of step (B) can be performed according to the following process conditions: the calcining temperature of the pre-burning carbonization treatment ranges between 800° C. and 1000° C. for a calcining time ranging between 4 hours and 16 hours; the calcining temperature of the high-temperature carbonization treatment ranges between 1000° C. and 1200° C. and is higher than the calcining temperature of the pre-burning carbonization treatment, for a calcining time ranging between 4 hours and 20 hours; and the calcining temperature of the graphitization treatment ranges between 2900° C. and 3000° C. for a soak time ranging between 8 hours and 30 days.

First Comparison Example

The method for preparing artificial graphite of the first comparison example is similar to that of the embodiment above, and differs in that, step (A) of the first comparison example forms coke from the heavy oil through batch coking reaction, so that the coke has a plurality of mesophase domains, wherein the size of the mesophase domains ranges between 50 and 200 µm by polarizing microscope analysis.

Compared to the first embodiment, in the method for preparing artificial graphite of the first comparison example, coke having a plurality of mesophase domains with a size ranging between 50 and 200 µm is formed from the heavy oil through batch coking reaction, thereby further forming few-crystalline artificial graphite from the coke by subsequent processes.

More specifically, step (A) of the first comparison example is performed according to the following process conditions: heavy oil is transported into a reaction tank, the temperature of the heavy oil is raised at a heating rate of 10° C./min from room temperature to 500° C. in an environment having a pressure of 1 Mpa for a soak time of 4 hours to cause the heavy oil to crack and condensation polymerize to produce coke, the reaction tank is cooled in air to room temperature, and the coke is taken out from the reaction tank.

First Test Example: Polarizing Microscope Analysis

In the first test example, the mesophase domains of the coke formed by the first embodiment through continuous coking reaction are analyzed by a polarizing microscope, and the coke formed by the first comparison example through batch coking reaction is used as comparison. The test results of the first test example are as shown in FIG. 2 and FIG. 3.

Figure 2:
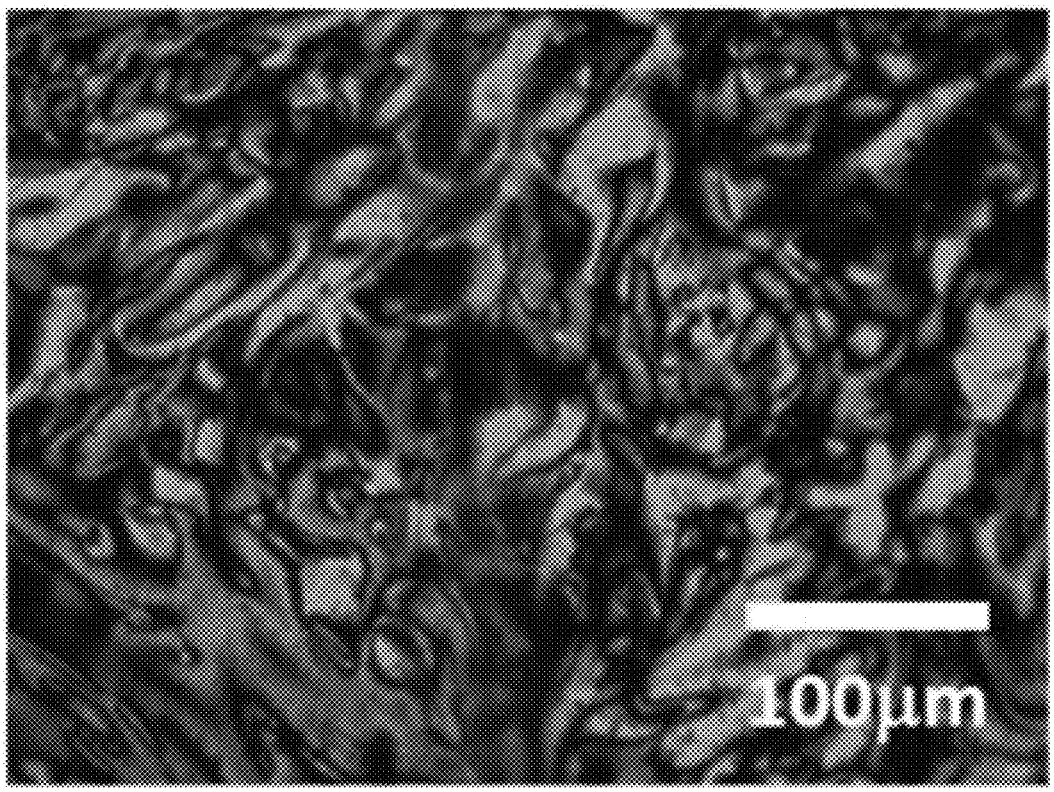
FIG. 2 is a polarizing microscope photograph of coke formed according to the first embodiment.
Figure 3:
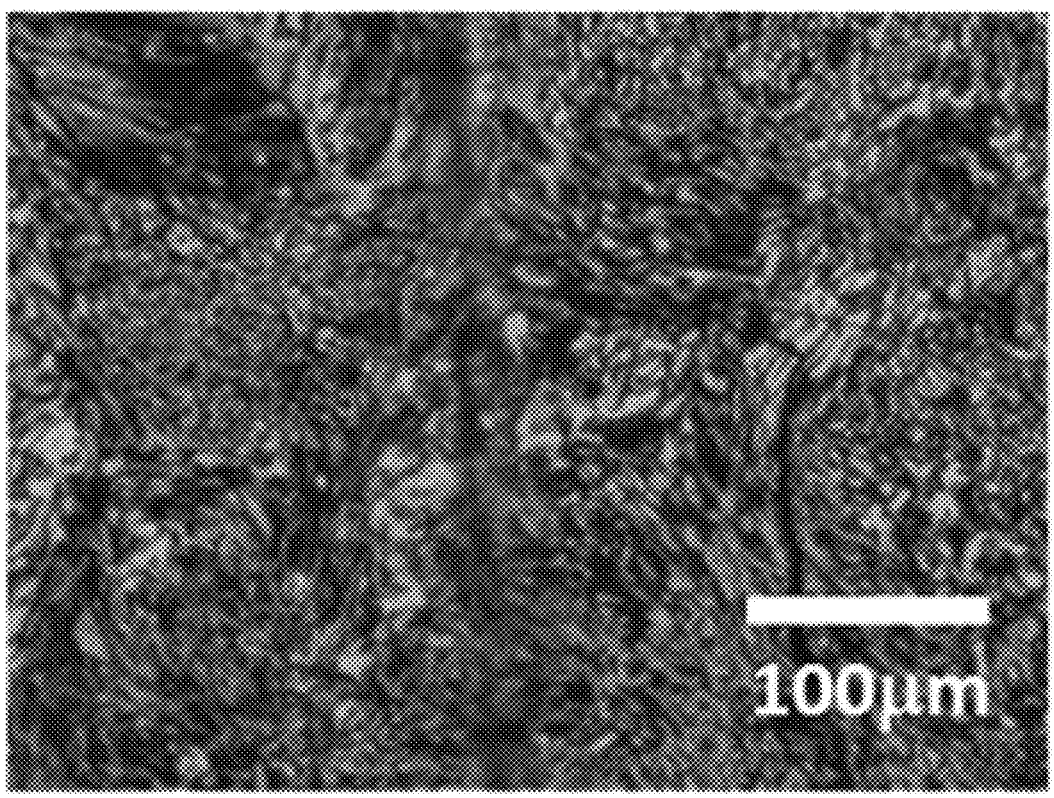
FIG. 3 is a polarizing microscope photograph of coke formed according to a first comparison example.

As shown in FIG. 2 and FIG. 3, observing the polarizing microstructures of the coke of both the first embodiment and the first comparison example, the coke formed by the first comparison example through batch coking reaction has more mesophase coalescence and can easily form coalescence areas and the coalescence areas have a larger structure, forming larger mesophase domains with a size ranging between 50 and 200 µm. In contrast, the coke formed by the first embodiment through continuous coking reaction has less mesophase coalescence and do not easily form coalescence areas, and the coalescence areas have a smaller structure, forming smaller mesophase domains with a size ranging between 1 and 30 µm.

Second Test Example: X-Ray Diffraction (XRD) Analysis

In the second test example, the polycrystalline artificial graphite formed by the first embodiment is analyzed by XRD analysis, and the few-crystalline artificial graphite formed by the first comparison example is used as comparison. The test results of the second test example are as shown in FIG. 4, FIG. 5 and FIG. 6.

Figure 4:
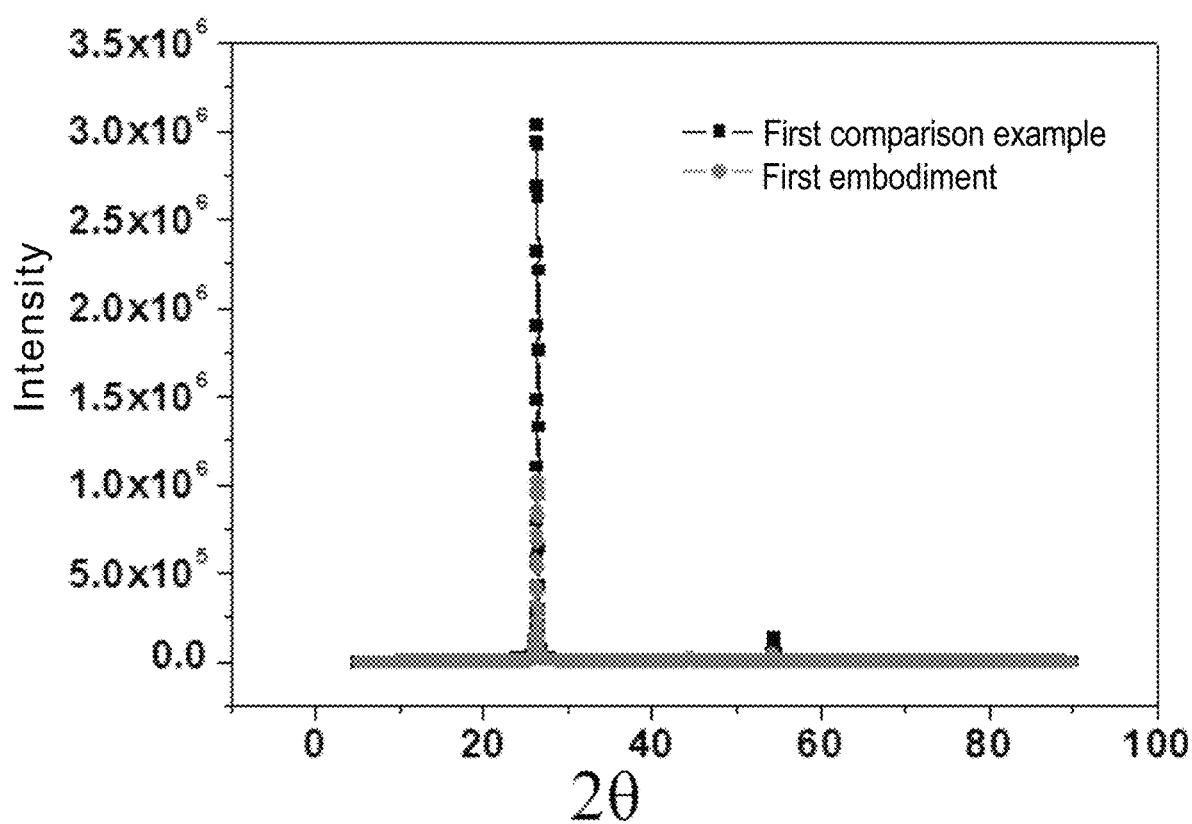
FIG. 4 is an X-ray diffraction spectra of artificial graphite formed according to the first embodiment and the first comparison example.
Figure 5:
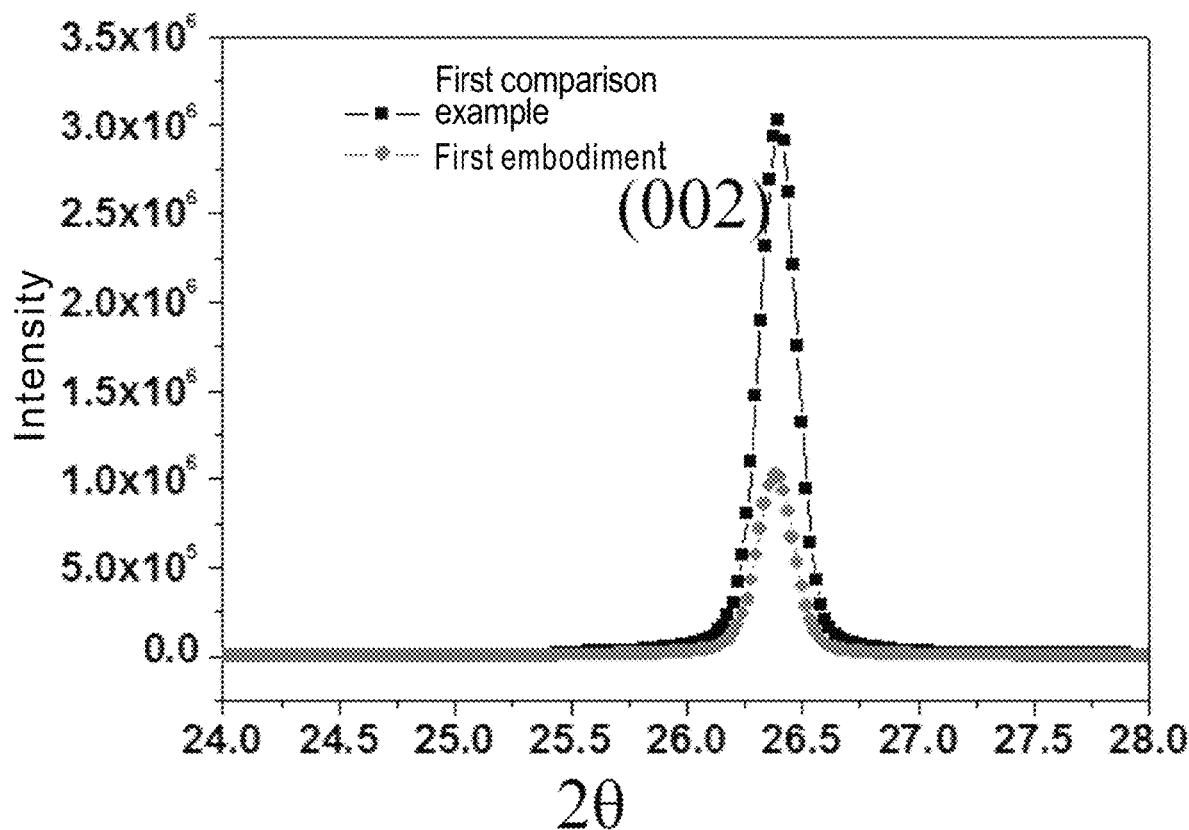
FIG. 5 is an X-ray diffraction spectra of artificial graphite formed according to the first embodiment and the first comparison example.
Figure 6:
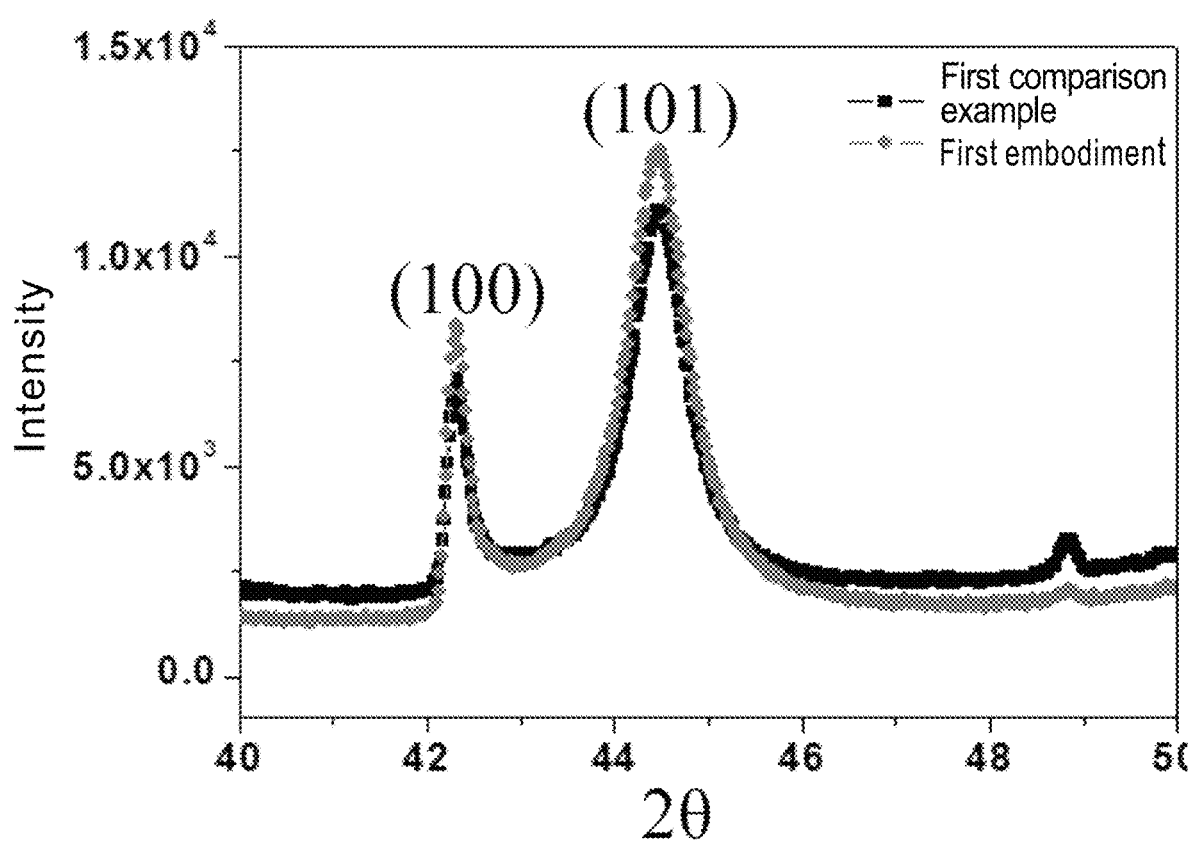
FIG. 6 is an X-ray diffraction spectra of artificial graphite formed according to the first embodiment and the first comparison example.
Figure 7:
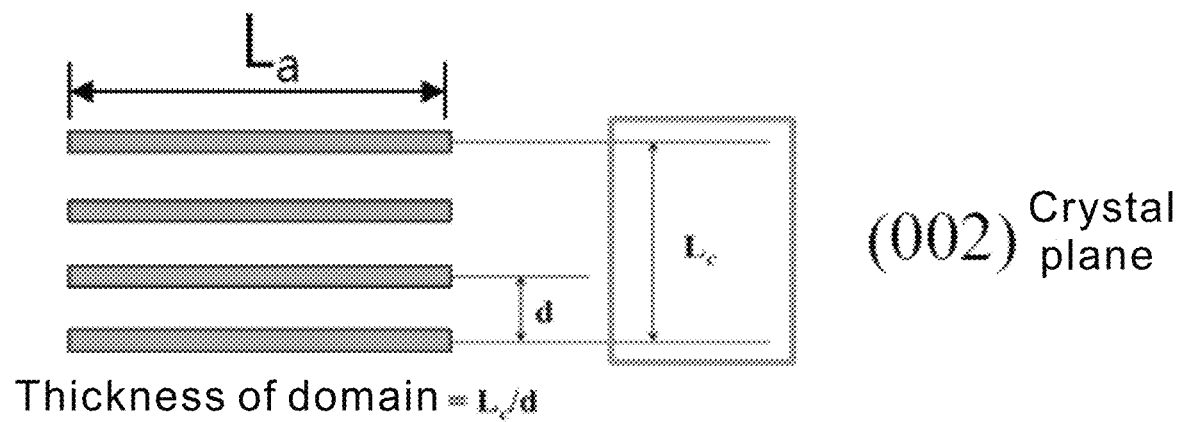
FIG. 7 is a schematic diagram of a crystal plane of a carbon material.

It is seen from the XRD spectra in FIG. 4, FIG. 5 and FIG. 6, there are primarily two peaks, and the grain size can be calculated according to the angle and full width at half maximum (FWHM) of the peak, with the calculation method as shown by equation (I) and FIG. 7:

thickness of domain:

$$\tau = \frac{L_c}{d} = \frac{\kappa \lambda}{dB \cos(\theta)}$$

$$\kappa = 0.89$$

$$\lambda(Cu) = 1.54051 \text{ Å}$$

That is, using the Scherer equation: (grain size)=(0.89× λ)/(d cos θ), the (002) crystal plane size $L_c$ of the carbon material can be obtained. Under the same diffraction angle of crystal plane, the grain size is inversely proportional to the FWHM of the peak. The values of the FWHM at the two peaks of the polycrystalline artificial graphite formed by the first embodiment are both larger than that of the few-crystalline artificial graphite formed by the first comparison example, and thus the polycrystalline artificial graphite formed by the first embodiment exhibits a smaller grain size, and the few-crystalline artificial graphite formed by the first comparison example has a larger size. That is, the first embodiment forms coke through continuous coking to further form polycrystalline artificial graphite; in contrast, the first comparison example forms coke through batch coking to further form few-crystalline artificial graphite.

Third Test Example: Raman Spectral Analysis

In the third test example, the polycrystalline artificial graphite formed by the first embodiment is analyzed by Raman spectral analysis, and the few-crystalline artificial graphite formed by the first comparison example is used as comparison. Respective analysis is repeatedly performed for three times. The test results of the third test example are as shown in FIG. 8 and FIG. 9.

Figure 8:
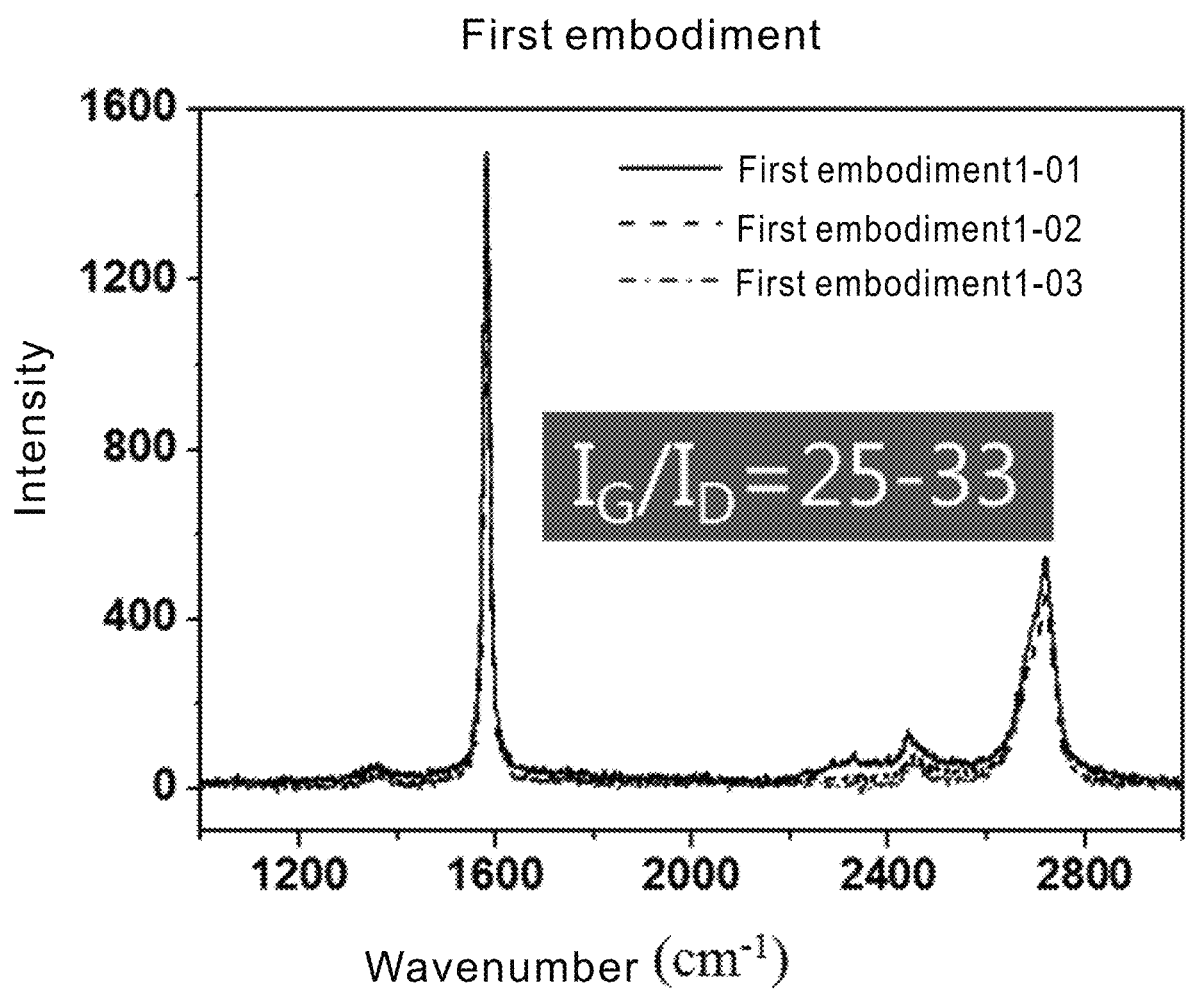
FIG. 8 is a Raman spectra of artificial graphite formed according to the first embodiment.
Figure 9:
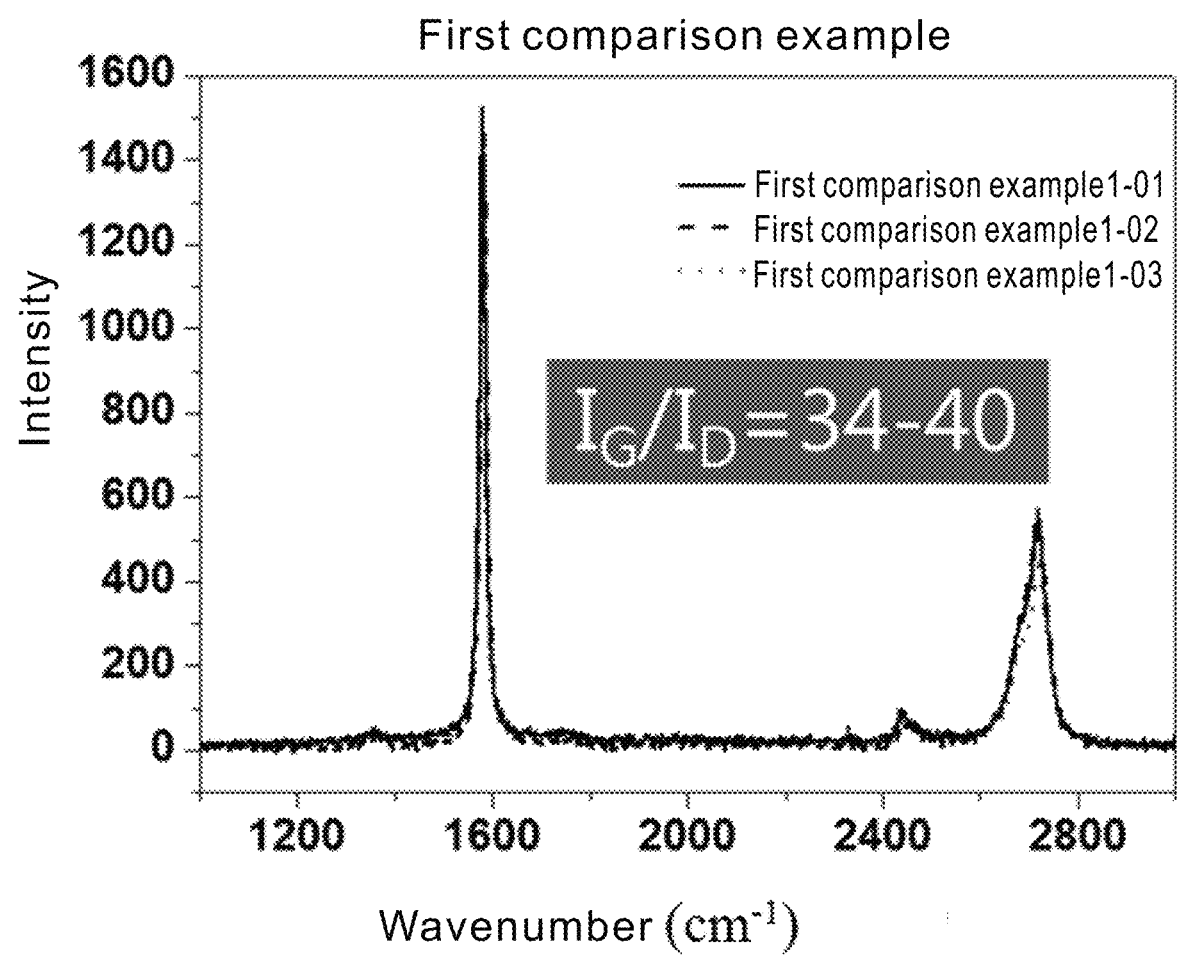
FIG. 9 is a Raman spectra of artificial graphite formed according to the first comparison example.

The (110) crystal plane size $L_a$ can be obtained from FIG. 8 and FIG. 9, and dimensional sizes of the graphite crystalline structure $L_a$ can be obtained by calculation according to $C(\lambda)=-126$ Å$+0.033\lambda$, $\lambda=532$ nm and $L_a=C(\lambda)/(I_D/I_G)$. According to the test results of the second test example and the third test example, the sizes of the microcrystalline areas of the carbon materials of the first embodiment and the first comparison example are calculated and organized as Table-1.

TABLE 1

| Mesophase domains of coke | Size (μm) | First embodiment 1 to 30 | First comparison example 50 to 200 |
|---|---|---|---|
| θ | (°) | 13.223 | 13.229 |
| FWHM | (°) | 0.258 | 0.195 |
| θ | Radian (rad.) | 0.2308 | 0.2307 |
| FWHM | Radian (rad.) | 0.0045 | 0.0034 |
| $L_c$ | (nm) | 31 | 41 |
| $L_a$ | (nm) | 120 to 160 | 170 to 200 |

Fourth Test Example: Charging/Discharging Performance Analysis

The polycrystalline artificial graphite formed by the first embodiment and the few-crystalline artificial graphite formed by the first comparison example are used as negative electrodes in the manufacturing of CR2032 button-type half cells and 18650 full cells according to standard methods, and characteristics of the half cell and the full cell are analyzed as below:

Table-2 below shows test results of analysis performed by a half-cell test platform of CPC Corporation, Taiwan.

TABLE 2

| Mesophase domains of coke | Size (μm) | First embodiment 1 to 30 | First comparison example 50 to 200 |
|---|---|---|---|
| BET | (m²/g) | 1.2 | 0.9 |
| P.V. | (cm³/g) | 0.007 | 0.005 |
| M.P. | (m²/g) | 0 | 0 |
| T.D. | (g/ml) | 1.04 | 1.07 |
| $C\_1^{st}$ | (mAh/g) | 387 | 383 |
| $D\_1^{st}$ | (mAh/g) | 363 | 359 |
| $1^{st}\_Irr$ | (mAh/g) | 24 | 24 |
| Q.E. | (%) | 93.8 | 93.7 |

Notes:
BET: Specific surface area measured by Brunauer-Emmett-Teller adsorption theory
P.V.: Pole Volume
M.P.: Micro Pole
T.D.: Tap Density
$C\_1^{st}$: Charging capacity of first cycle
$D\_1^{st}$: Discharging capacity of first cycle
$1^{st}\_Irr$: Irreversible capacity of first cycle
Q.E.: Coulombic Efficiency As shown in Table-2, the discharging capacity of the first cycle ($D\_1^{st}$) is more than 360 mAh/g, the discharging capacity of the first cycle ($D\_1^{st}$) of the first comparison example is near 360 mAh/g, the first irreversible capacities of the first cycle ($1^{st}\_Irr$) of both are 24 mAh/g, and the Coulombic efficiencies (Q.E.) of both are 93.8% and 93.7%, respectively.

Figure 10:
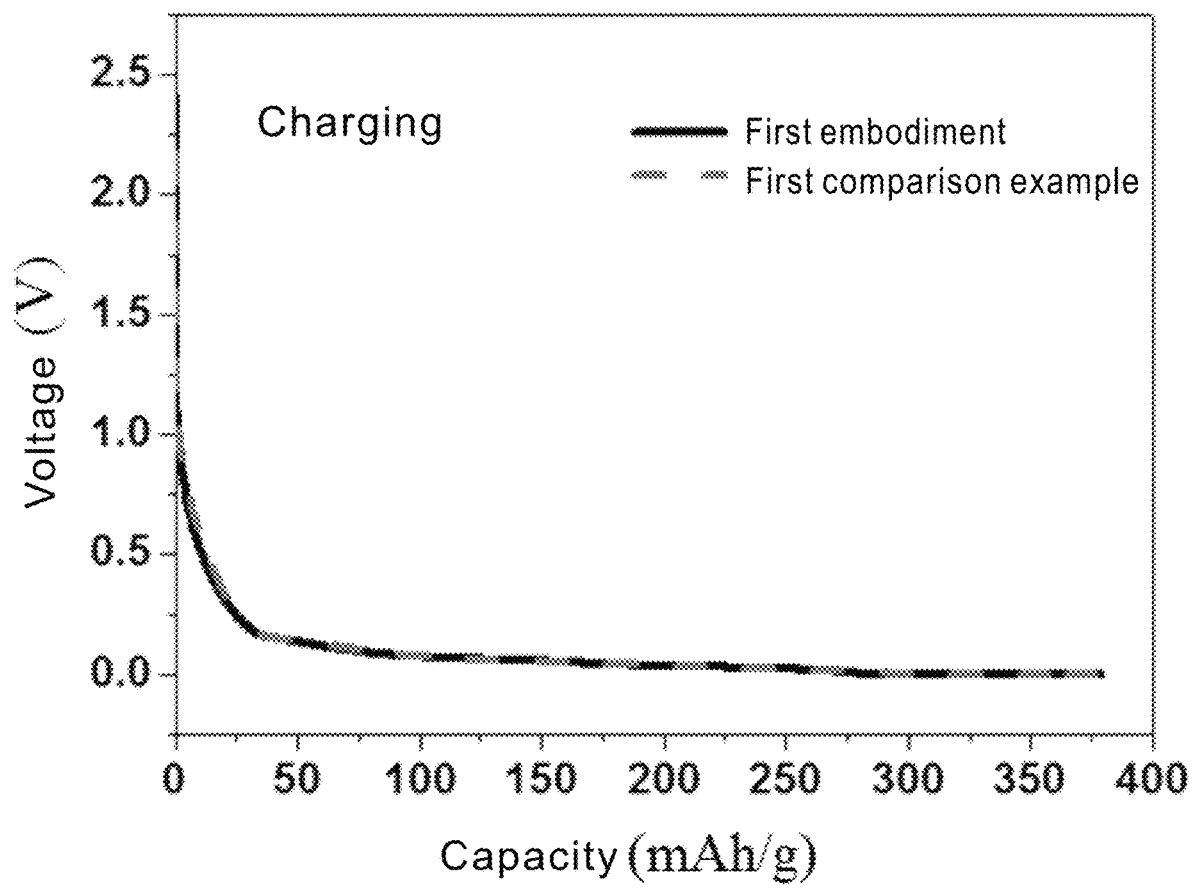
FIG. 10 is an analysis diagram of charging curves of batteries applying artificial graphite of the first embodiment and the first comparison example, respectively.
Figure 11:
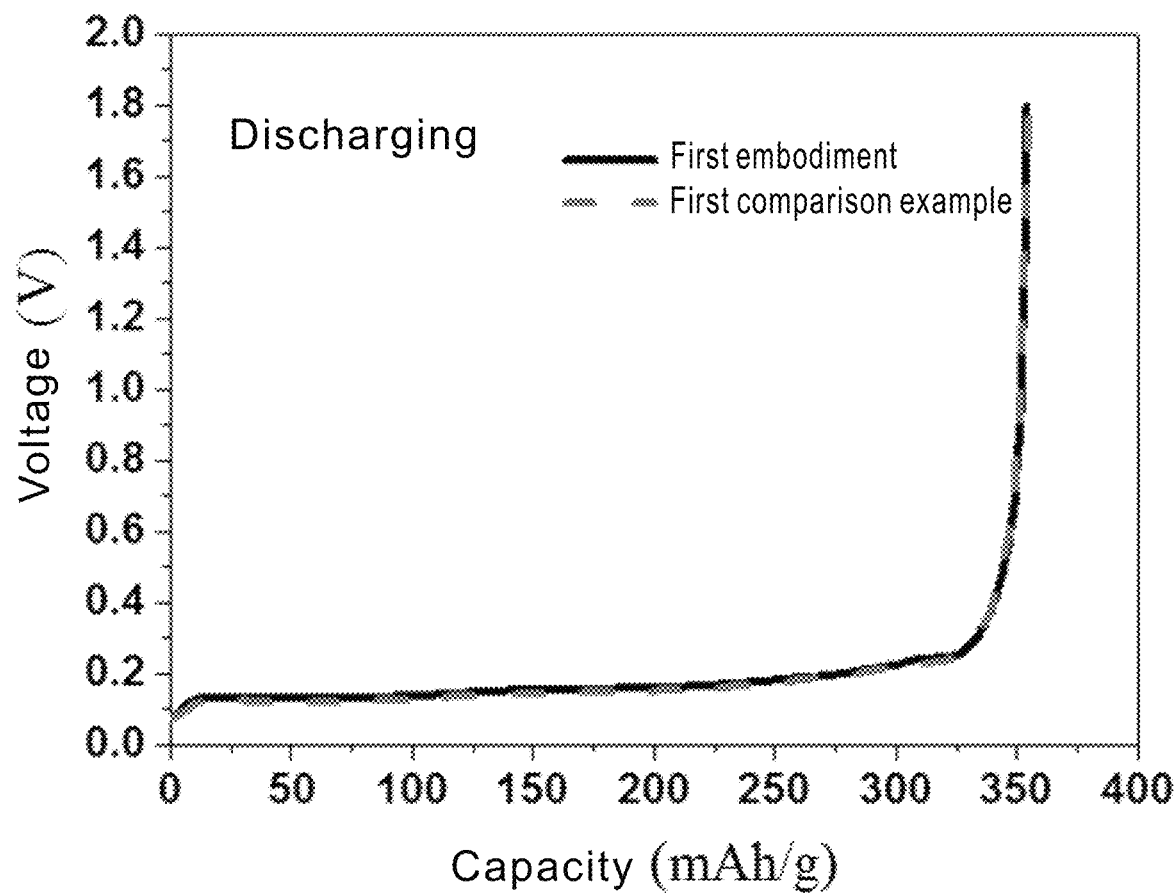
FIG. 11 is an analysis diagram of discharging curves of batteries applying artificial graphite of the first embodiment and the first comparison example, respectively.

Charging/discharging curve analysis is performed on batteries using the polycrystalline artificial graphite formed by the first embodiment and the few-crystalline artificial graphite formed by the first comparison example as electrodes, and the test results are as shown in FIG. 10 and FIG. 11.

As shown in FIG. 10 and FIG. 11, it is discovered that the charging curves and discharging curves of the two coincidently overlap, and so it can be determined that, under a low power, intercalation/deintercalation behaviors of lithium ions of artificial graphite of the first embodiment and the artificial graphite of the first comparison example are identical, proofing that the graphite carbon structure characteristics of the two match. Moreover, the specific surface areas and tap densities of the two materials are also extremely close; in other words, the structural difference in a precursor (coke) only causes the artificial graphite to exhibit a few-crystalline structure or a polycrystalline structure, without affecting the original fundamental physical properties, capacities and irreversible capacities of the materials.

Fast charging/fast discharging tests are performed on batteries using the polycrystalline artificial graphite formed by the first embodiment and the few-crystalline artificial graphite formed by the first comparison example as electrodes, and the test results are as shown Table-3:

TABLE 3

| Mesophase domains of coke | Size (μm) | First embodiment 1 to 30 | First comparison example 50 to 200 |
|---|---|---|---|
| Fast charging | 0.1 C | 100 | 100 |
|  | 1 C | 89.3 | 85.6 |
|  | 2 C | 87.6 | 80.7 |
|  | 5 C | 56.1 | 42.3 |
| Fast discharging | 0.1 C | 100 | 100 |
|  | 1 C | 100 | 99.5 |
|  | 2 C | 99.8 | 98.9 |
|  | 5 C | 99.3 | 98.2 |
|  | 10 C | 97.7 | 94.2 |

As shown in Table-3, the fast charging capability from 0.1 C (charging for 10 hours) to 5 C (12 minutes) are 100% to approximately 42% for the first comparison example, and 100% to approximately 56% for the first embodiment; under high C-rate 5 C fast charging, and the fast charging capabilities between the two differ by approximately 13%, which is speculated to be caused by a faster intercalation speed of lithium ions of the artificial graphite of the first embodiment under more high-speed charging. The fast discharging test results indicate that the fast discharging capabilities from 1 C to 5 C between the two differ by approximately 1%; the discharging capabilities between the two under high C-rate 10 C fast charging differ by approximately 3%, which is speculated to be caused by a faster deintercalation speed of lithium ions of the artificial graphite of the first embodiment under more high-speed discharging (high power output).

Figure 12:
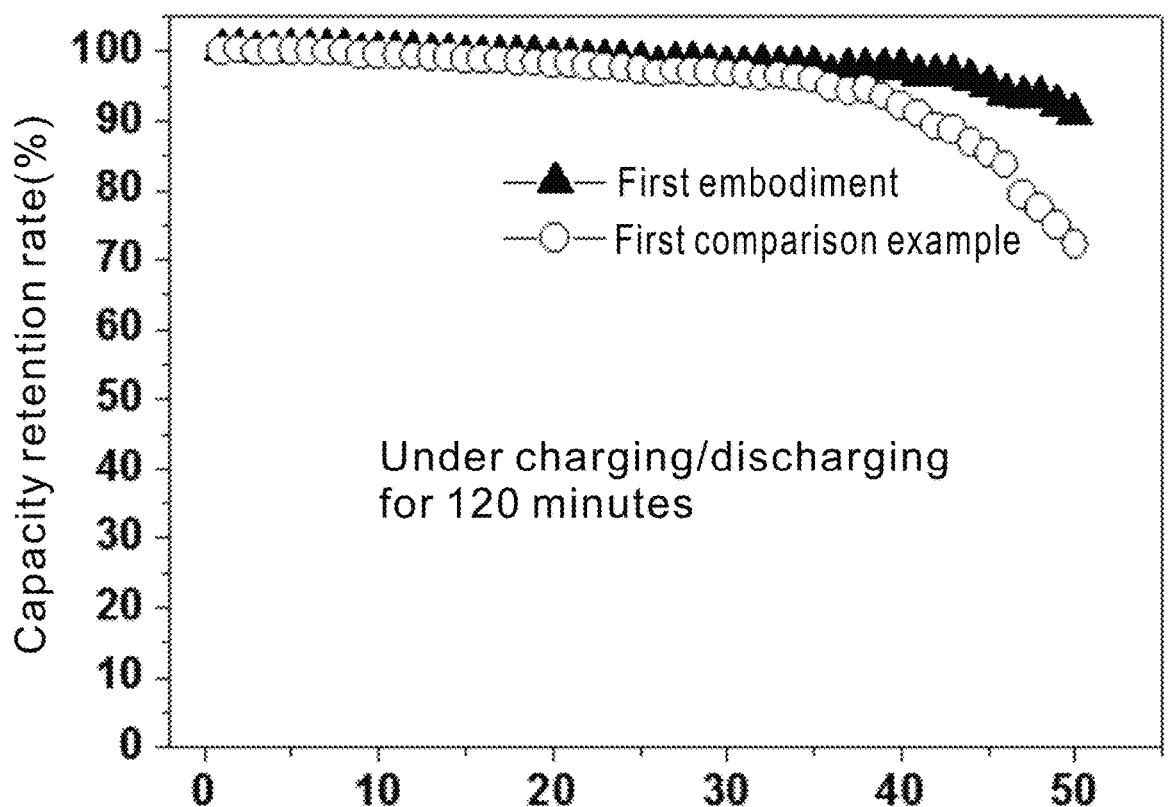
FIG. 12 is a diagram of durability tests of batteries applying artificial graphite of the first embodiment and the first comparison example under charging/discharging for 120 minutes, respectively.
Figure 13:
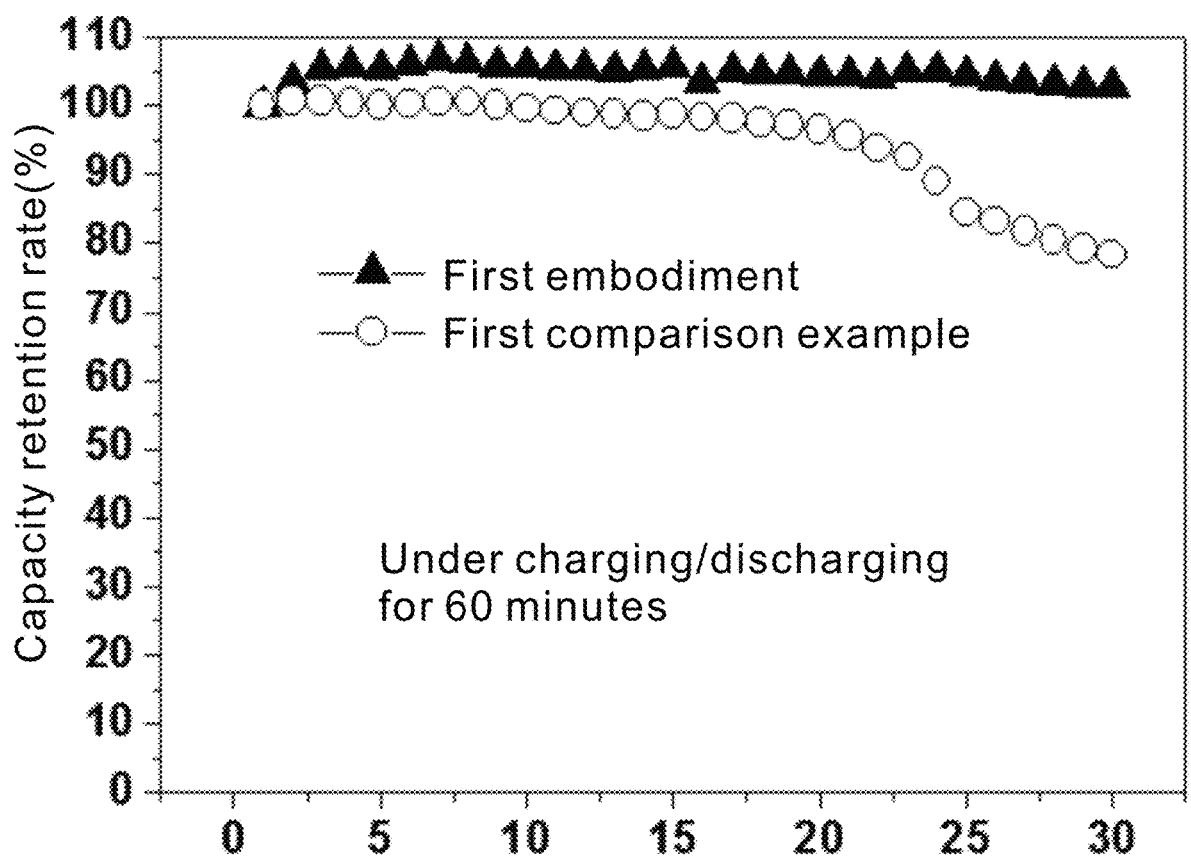
FIG. 13 is a diagram of durability tests of batteries applying artificial graphite of the first embodiment and the first comparison example under charging/discharging for 60 minutes, respectively.
Figure 14:
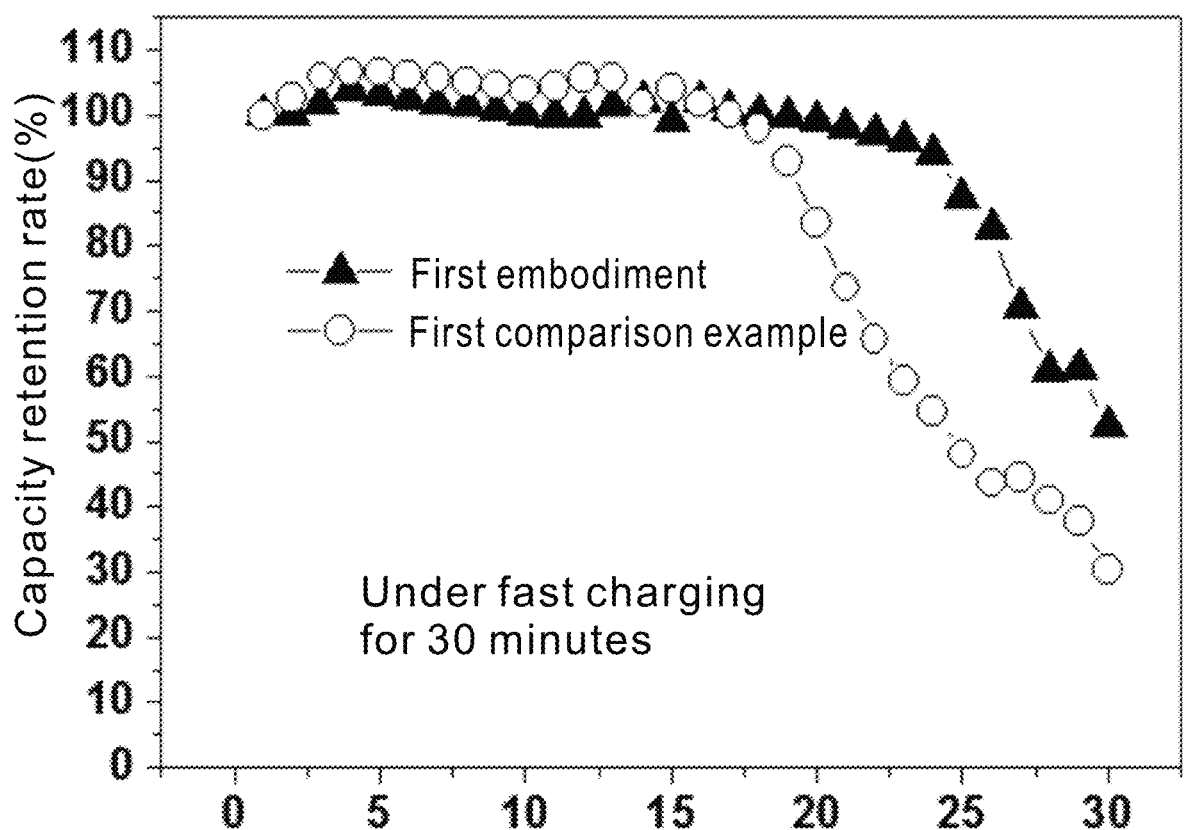
FIG. 14 is a diagram of durability tests of batteries applying artificial graphite of the first embodiment and the first comparison example under fast charging for 30 minutes, respectively.
Figure 15:
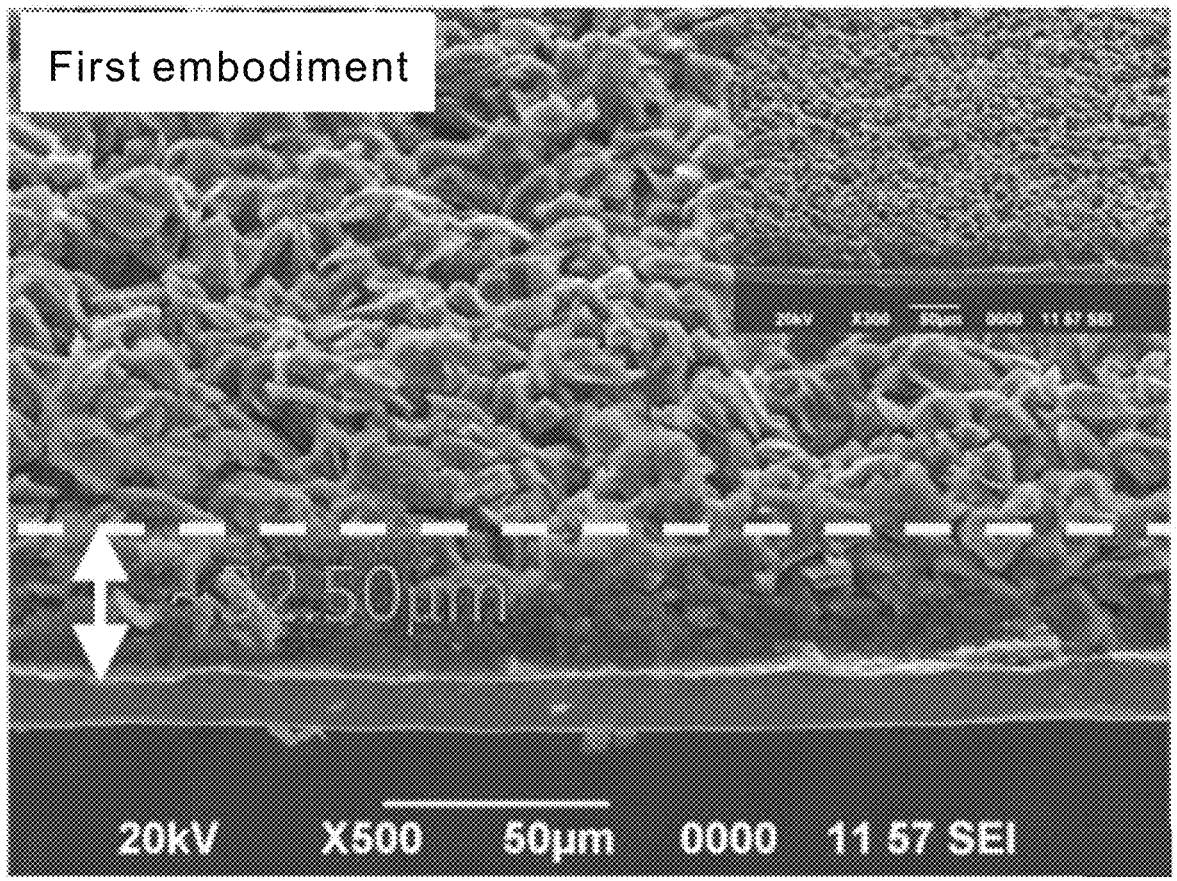
FIG. 15 is a scanning electron micrograph of batteries applying artificial graphite of the first embodiment before undergoing 3 cycles of charging/discharging.
Figure 16:
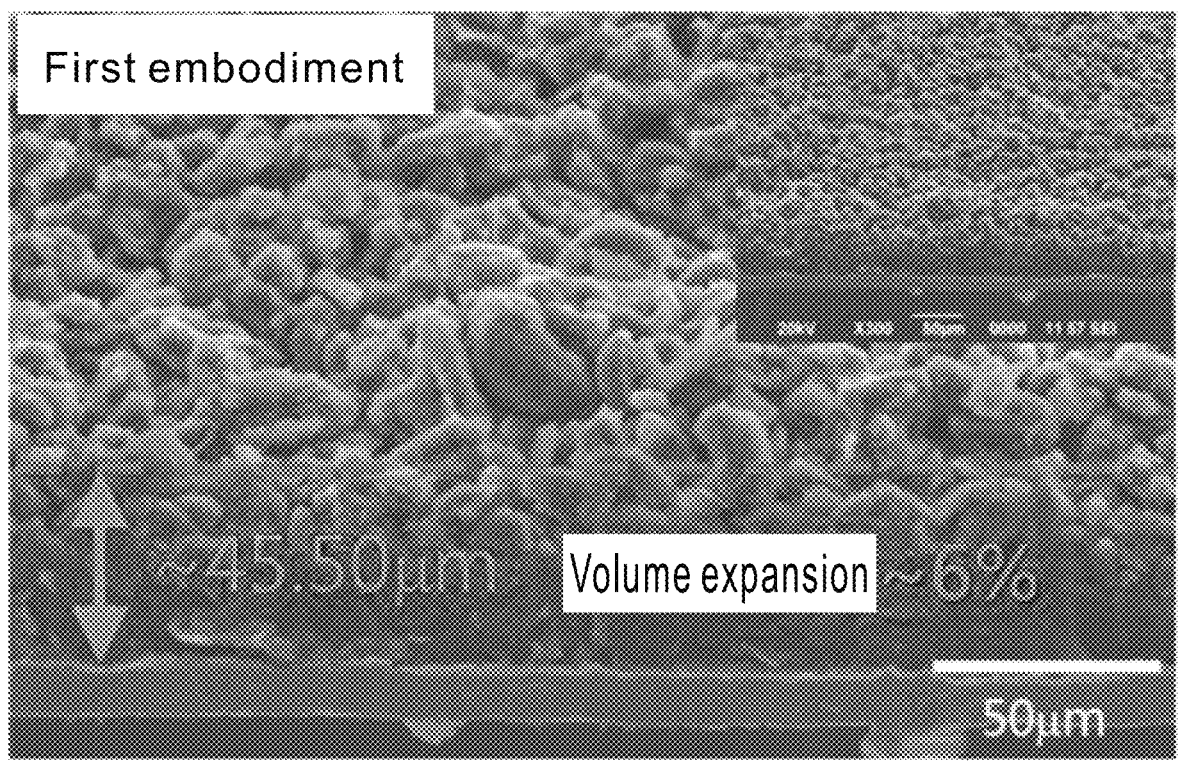
FIG. 16 is a scanning electron micrograph of the volume expansion analysis of batteries applying artificial graphite of the first embodiment after undergoing 3 cycles of charging/discharging.
Figure 17:
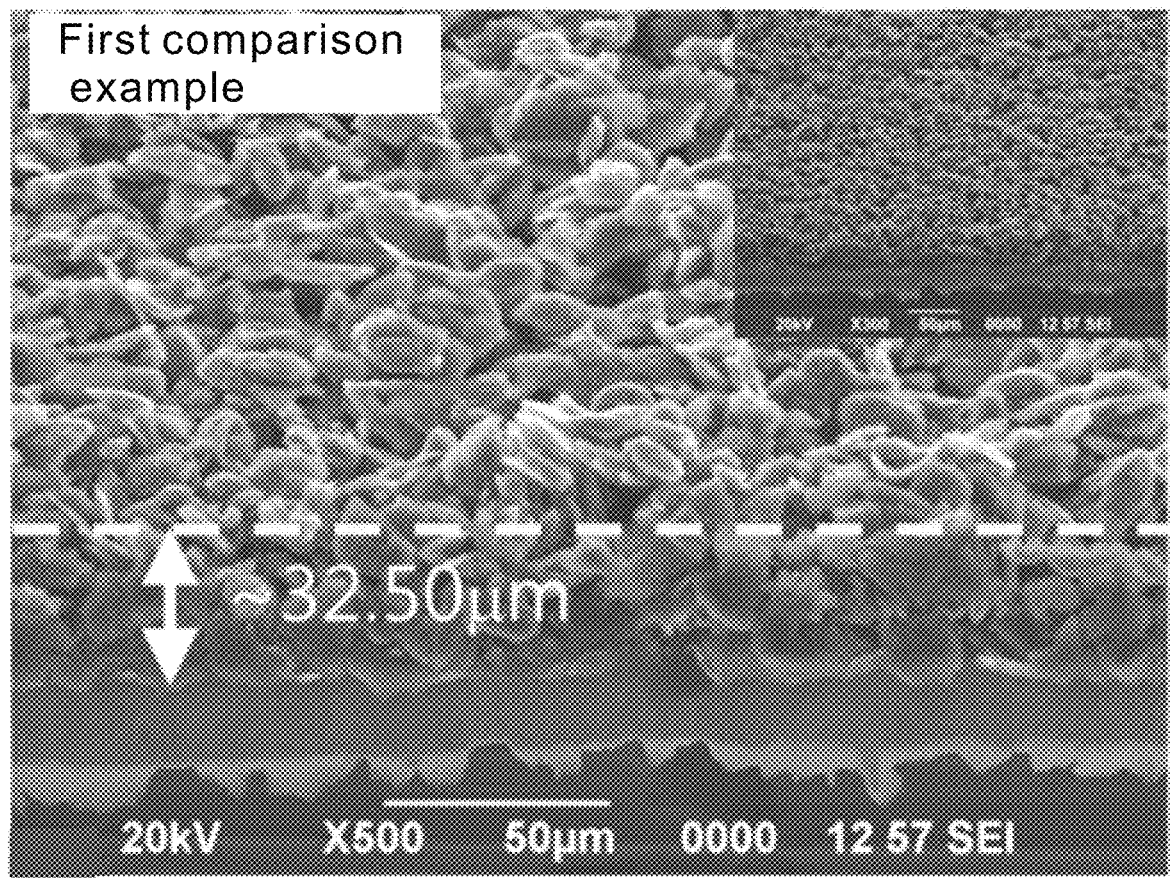
FIG. 17 is a scanning electron micrograph of batteries applying artificial graphite of the first comparison example before undergoing 3 cycles of charging/discharging.
Figure 18:
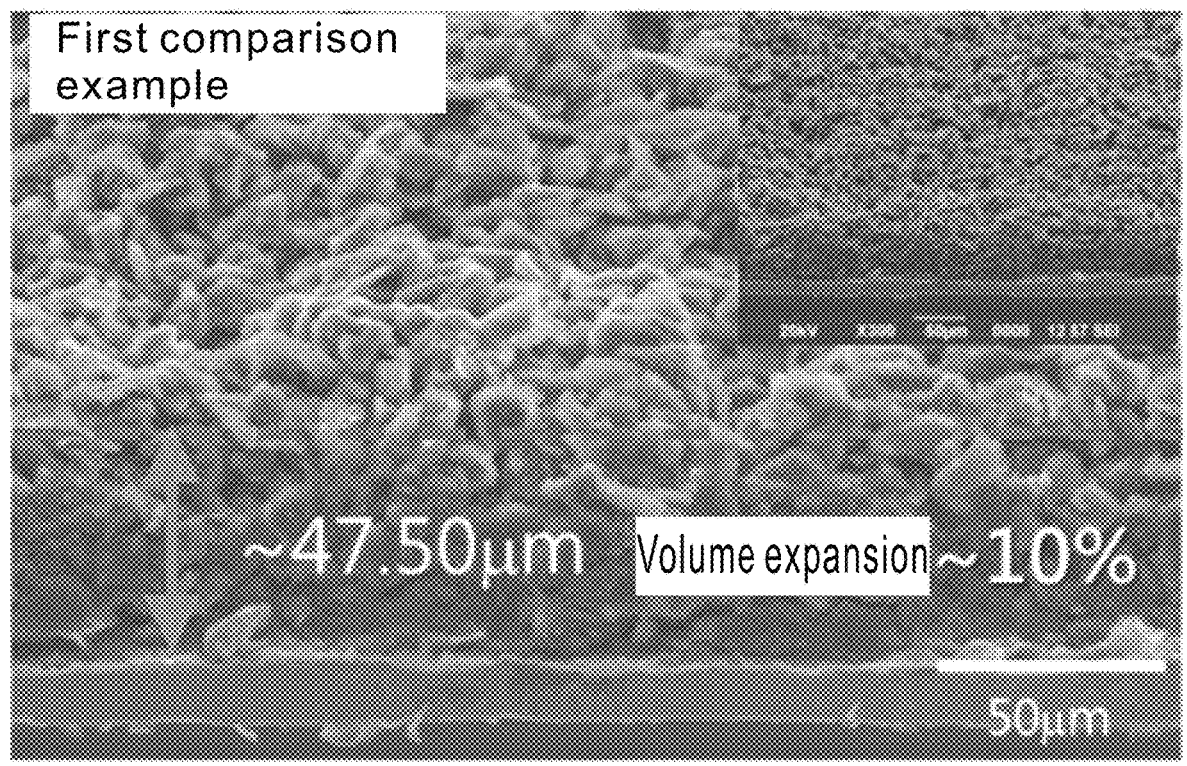
FIG. 18 is a scanning electron micrograph of the volume expansion analysis of batteries applying artificial graphite of the first comparison example after undergoing 3 cycles of charging/discharging.

Further, durability tests are respectively performed on batteries using the polycrystalline artificial graphite formed by the first embodiment and the few-crystalline artificial graphite formed by the first comparison example as electrodes, and the test results are as shown in FIG. 12, FIG. 13 and FIG. 14.

As shown in FIG. 12, FIG. 13 and FIG. 14, under 0.5 C/0.5 C charging/discharging, the durability of the polycrystalline artificial graphite of the first embodiment is better than that of the few-crystalline artificial graphite of the first comparison example; under tests of 50 cycles, the capacity retention rate of the polycrystalline artificial graphite of the first embodiment is more than 90%, and that of the few-crystalline artificial graphite of the first comparison example is less than 80%. Under 1 C/1 C charging/discharging, under tests of 30 cycles, the capacity retention rate of the polycrystalline artificial graphite of the first embodiment is approximately 100%, and that of the few-crystalline artificial graphite of the first comparison example is less than 80%. Under higher 2 C/2 C charging/discharging, under tests of 30 cycles, the capacity retention rate of the polycrystalline artificial graphite of the first embodiment is approximately 50%, and that of the few-crystalline artificial graphite of the first comparison example is less than 30%.

Further, volume expansion analysis is performed on batteries using the polycrystalline artificial graphite formed by the first embodiment and the few-crystalline artificial graphite formed by the first comparison example as electrodes, and the test results are as shown in FIG. 15, FIG. 16, FIG. 17 and FIG. 18.

In the volume expansion analysis in FIG. 15, FIG. 16, FIG. 17 and FIG. 18, batteries using the artificial graphite of the first embodiment and the first comparison example as electrodes firstly undergo 3 cycles of 0.1 C charging/0.1 C discharging. Once having undergone 3 cycles of charging/discharging such that the volume of negative electrodes of the artificial graphite is expanded, the change in thickness of the negative electrodes of the artificial graphite before the charging/discharging is analyzed by a scanning electron microscope (SEM), and the volume expansion percentage is calculated according to the change in thickness of the negative electrodes of the artificial graphite.

As shown in FIG. 15, FIG. 16, FIG. 17 and FIG. 18, the volume expansion of the few-crystalline artificial graphite of the first comparison example is approximately 10%, and the volume expansion of the polycrystalline artificial graphite of the first embodiment is approximately 6%. That is, the results have verified that the polycrystalline artificial graphite of the first embodiment has more grain boundaries (GB), which provide more areas for accommodating expansion, hence reducing the expansion extent after having undergone charging/discharging. Thus, a battery using the polycrystalline artificial graphite of the first embodiment as electrodes is capable of preventing graphite peeling caused by volume expansion of artificial graphite and avoiding loss of an internal conductive network of the negative pole pieces, thereby improving the cycle life of the battery.

The differences in microstructures of the artificial graphite of the first embodiment and the first comparison example cause performance differences in cycle life of batteries applying the artificial graphite. Because the artificial graphite of the first comparison example has larger microstructures, under the same macroparticles, there are fewer grains and hence less grain boundaries areas. During charging/discharging of lithium ions of a lithium battery applying artificial graphite, lithium ions can be stored between carbon layers, and the volume expansion caused can be alleviated by grain boundaries between the carbon layers. As the grain boundaries decrease, volume expansion and graphite peeling cannot be alleviated, such that the cycle life of batteries applying the artificial graphite is shorter. Thus, batteries applying the artificial graphite of the first comparison example have fewer areas for accommodating volume expansion, resulting in larger volume expansion and a shorter cycle life.

Figure 19:
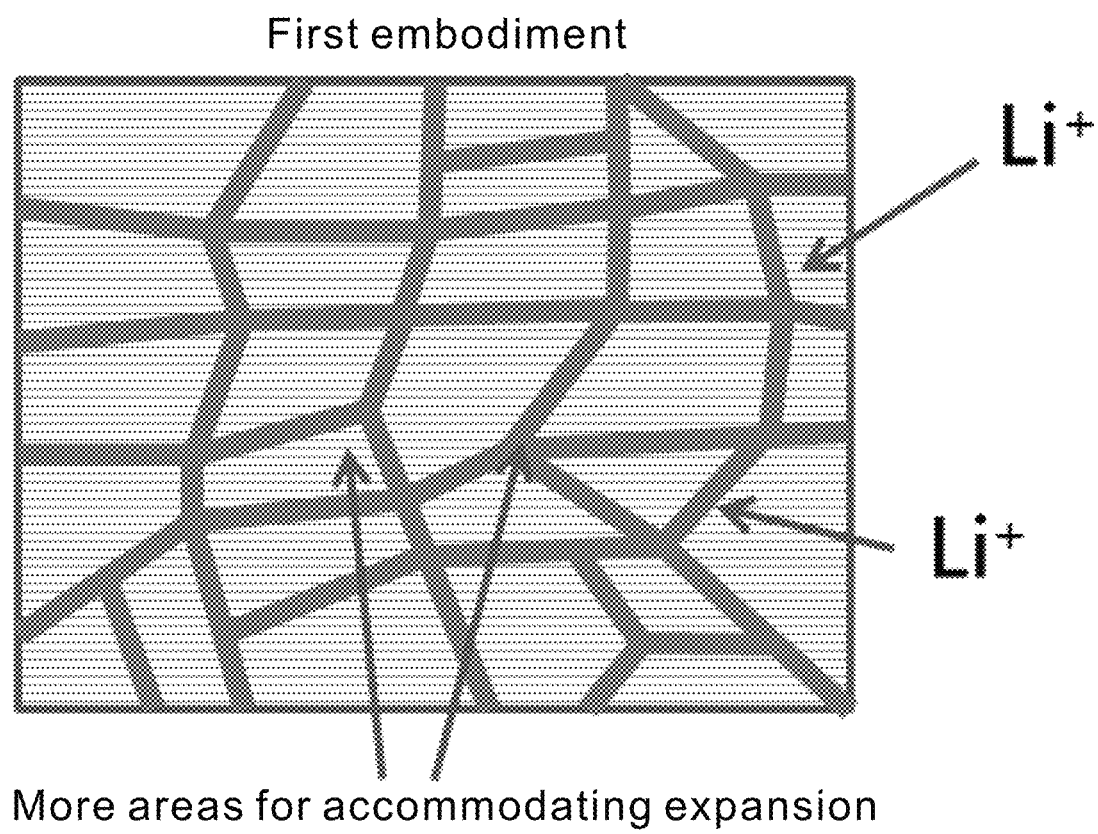
FIG. 19 is a schematic diagram of modes of volume expansion that can be accommodated by artificial graphite of the first embodiment.
Figure 20:
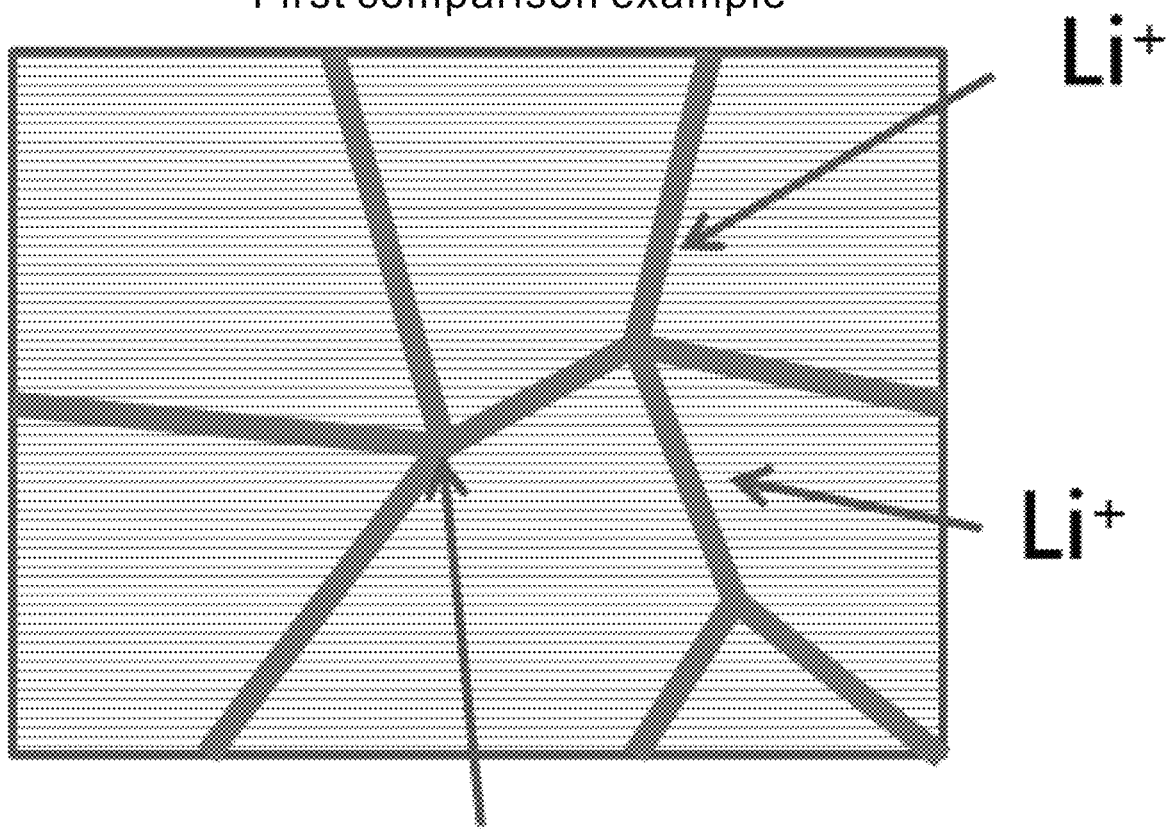
FIG. 20 is a schematic diagram of modes of volume expansion that can be accommodated by artificial graphite of the first comparison example.

Conversely, because the artificial graphite of the first embodiment has smaller microstructures, under the same macroparticles, there are more grains and hence more grain boundaries areas. During charging/discharging of lithium ions of a lithium battery applying artificial graphite, lithium ions can be stored between carbon layers, and the volume expansion caused can be alleviated by grain boundaries between the carbon layers. As the grain boundaries increase, volume expansion and graphite peeling can be alleviated, such that the cycle life of batteries applying the artificial graphite can be longer. Thus, batteries applying the artificial graphite of the first embodiment have more areas for accommodating volume expansion, resulting in smaller volume expansion and a longer cycle life. As shown in FIG. 19 and FIG. 20, there are more grain boundaries of the artificial graphite of the first embodiment for reducing the volume expansion of the intercalated lithium ions, further improving the cycle life and fast charging durability of batteries applying the artificial graphite. The polycrystalline artificial graphite of the first embodiment have more areas for accommodating expansion and is better capable of receiving/responding to larger volume expansion within a shorter period. Consequently, in respect of cycle life performance, batteries applying the polycrystalline artificial graphite of the first embodiment are better than batteries applying the few-crystalline artificial graphite of the first comparison example.

In the method for preparing artificial graphite of the present invention, soft carbon prepared by high-temperature carbonization treatment is further processed by graphitization treatment to obtain polycrystalline artificial graphite. In general, batteries applying artificial graphite have a poor fast charging capability and shorter durability, and especially have shorter durability under fast charging. In contrast, batteries applying soft carbon are better in terms of fast charging capability and durability. However, the polycrystalline artificial graphite prepared by the method for preparing artificial graphite of the present invention is capable of significantly improving common drawbacks of artificial graphite above.

As described above, in the method for preparing artificial graphite of the present invention, coke having a plurality of mesophase domains with a size ranging between 1 and 30 µm is formed from the heavy oil through continuous coking reaction, thereby further forming polycrystalline artificial graphite from the coke by subsequent processes. The polycrystalline artificial graphite prepared by the method for preparing artificial graphite of the present invention provides batteries using the artificial graphite as electrodes with better fast charging/fast discharging capabilities and cycle life.

While the present disclosure has been described by means of specific embodiments, numerous modifications and variations could be made thereto by those skilled in the art without departing from the scope and spirit of the present disclosure set forth in the claims. The above-mentioned embodiments only exemplary illustrate the present invention, but do not limit the present invention. Any person having ordinary skill in the art can modify and change the above-mentioned embodiments without departing from the spirit and scope of the present invention. Therefore, the scope of the present invention should be as described in the claims.

What is claimed is:
1. A method for preparing artificial graphite comprising:
   (A) preparing heavy oil, forming coke from the heavy oil through continuous coking reaction such that the coke has a plurality of mesophase domains, wherein a size of the mesophase domains ranges between 1 and 30 µm by polarizing microscope analysis; and
   (B) processing the coke formed by step (A) sequentially by pre-burning carbonization treatment, grinding classification, high-temperature carbonization treatment and graphitization treatment to form polycrystalline artificial graphite from the coke.
2. The method for preparing artificial graphite according to claim 1, wherein a (002) crystal plane size $L_c$ of the polycrystalline artificial graphite is less than 30 nm.

3. The method for preparing artificial graphite according to claim 1, wherein a (110) crystal plane size $L_a$ of the polycrystalline artificial graphite ranges between 120 nm and 160 nm.

4. The method for preparing artificial graphite according to claim 1, wherein step (A) comprises:
transporting the heavy oil into a heating furnace, and heating the heavy oil under conditions of a heating temperature ranging between 480° C. and 520° C. at a pressure ranging between 0.18 Mpa and 0.22 Mpa for a heating time ranging between 0.01 hour and 0.02 hour, and simultaneously transporting water into the heating furnace for heating to produce water vapor;
transporting the heated heavy oil at a high flow speed of 0.02 m$^3$/s to 0.03 m$^3$/s in the presence of the water vapor by a delivery pipe to a coking tower; and
causing the heated heavy oil to crack and condensation polymerize under conditions of a reaction temperature ranging between 470° C. and 520° C. at a pressure ranging between 0.18 Mpa and 0.22 Mpa for a reaction time ranging between 16 hours and 24 hours to form coke.

5. The method for preparing artificial graphite according to claim 4, wherein a content of the water is 0.8 wt % to 1.2 wt % of a total of the heavy oil.

6. The method for preparing artificial graphite according to claim 1, wherein in step (B), a calcining temperature of the pre-burning carbonization treatment ranges between 800° C. and 1000° C., and a calcining time ranges between 4 hours and 16 hours.

7. The method for preparing artificial graphite according to claim 1, wherein in step (B), the grinding classification grinds and sieves by a cyclone classifier the pre-burning carbonization treatment processed coke to select the pre-burning carbonization treatment processed coke having an average particle diameter $D_{50}$ of 12 μm to 15 μm.

8. The method for preparing artificial graphite according to claim 1, wherein in step (B), a calcining temperature of the high-temperature carbonization treatment ranges between 1000° C. and 1200° C. and is higher than the calcining temperature of the pre-burning carbonization treatment, and a calcining time ranges between 4 hours and 20 hours.

9. The method for preparing artificial graphite according to claim 1, wherein in step (B), a calcining temperature of the graphitization treatment is 2900° C. to 3000° C. and a soak time is 8 hours to 30 days.

* * * * *